US012572817B2

(12) United States Patent
Luo et al.

(10) Patent No.: US 12,572,817 B2
(45) Date of Patent: Mar. 10, 2026

(54) FEDERATED RECOMMENDATION SYSTEM, DEVICE, AND METHOD

(71) Applicant: City University of Hong Kong, Kowloon (HK)

(72) Inventors: Sichun Luo, Kowloon (HK); Linqi Song, Kowloon (HK)

(73) Assignee: City University of Hong Kong, Kowloon (HK)

( * ) Notice: Subject to any disclaimer, the term of this patent is extended or adjusted under 35 U.S.C. 154(b) by 575 days.

(21) Appl. No.: 18/310,765

(22) Filed: May 2, 2023

(65) Prior Publication Data

US 2023/0419123 A1     Dec. 28, 2023

Related U.S. Application Data

(60) Provisional application No. 63/355,798, filed on Jun. 27, 2022.

(51) Int. Cl.
*G06N 3/00*      (2023.01)
*G06N 3/045*     (2023.01)
*G06N 3/098*     (2023.01)

(52) U.S. Cl.
CPC ............. *G06N 3/098* (2023.01); *G06N 3/045* (2023.01)

(58) Field of Classification Search
CPC ....................................................... G06N 3/00
See application file for complete search history.

(56) References Cited

U.S. PATENT DOCUMENTS

2014/0297456 A1 * 10/2014 Sapugay ............ G06Q 30/0631
                                                    705/26.7
2023/0021233 A1 *  1/2023 Ammad-Ud-Din .........................
                                                    G06Q 30/0201

OTHER PUBLICATIONS

Waqar Ali, Rajesh Kumar, Zhiyi Deng, Yansong Wang, and Jie Shao. 2021. A federated learning approach for privacy protection in context-aware recommender systems. Comput. J. 64, 7 (2021), 1016-1027.

(Continued)

*Primary Examiner* — Maryam A Nasri
(74) *Attorney, Agent, or Firm* — Renner, Kenner, Greive, Bobak, Taylor & Weber

(57) ABSTRACT

A federated recommendation system with a server and client devices. The server can group client device users into clusters. The server can further: for each respective cluster, process local model parameters associated with local graph neural networks for at least some client device users in the corresponding cluster, to obtain cluster-level model parameters associated with a cluster-level federated model for the corresponding cluster; and process local model parameters associated with local graph neural networks for at least some client device users in each of two or more of the clusters to obtain global model parameters associated with a global federated model. The server can further provide, to a client device, the cluster-level model parameters associated with the corresponding cluster-level federated model and the global model parameters associated with the global federated model, for facilitating generation or update of a personalized recommendation model for the client device user.

30 Claims, 5 Drawing Sheets

(56)　　　　　　　References Cited

OTHER PUBLICATIONS

Muhammad Ammad-Ud-Din, Elena Ivannikova, Suleiman A Khan, Were Oyomno, Qiang Fu, Kuan Eeik Tan, and Adrian Flanagan. 2019. Federated collaborative filtering for privacy-preserving personalized recommendation system. arXiv preprint arXiv:1901. 09888 (2019).

Di Chai, Leye Wang, Kai Chen, and Qiang Yang. 2020. Secure federated matrix factorization. IEEE Intelligent Systems (2020).

Mukund Deshpande and George Karypis. 2004. Item-based top-n recommendation algorithms. ACM Transactions on Information Systems (TOIS) 22, 1 (2004), 143-177.

Yongjie Du, Deyun Zhou, Yu Xie, Jiao Shi, and Maoguo Gong. 2021. Federated matrix factorization for privacy-preserving recommender systems. Applied Soft Computing 111 (2021), 107700.

Ali Mamdouh Elkahky, Yang Song, and Xiaodong He. 2015. A multi-view deep learning approach for cross domain user modeling in recommendation systems. In Proceedings of the 24th international conference on world wide web. 278-288.

Yu Guo, Hongcheng Xie, Yinbin Miao, Cong Wang, and Xiaohua Jia. 2020. Fedcrowd: A federated and privacy-breserving crowdsourcing platform on blockchain. IEEE Transactions on Services Computing (2020).

Xiangnan He, Kuan Deng, Xiang Wang, Yan Li, Yongdong Zhang, and Meng Wang. 2020. Lightgcn: Simplifying and powering graph convolution network for recommendation. In Proceedings of the 43rd International ACM SIGIR conference on research and development in Information Retrieval. 639-648.

Zitao Li, Bolin Ding, Ce Zhang, Ninghui Li, and Jingren Zhou. 2021. Federated matrix factorization with privacy guarantee. Proceedings of the VLDB Endowment 15, 4 (2021), 900-913.

James MacQueen et al. 1967. Some methods for classification and analysis of multivariate observations. In Proceedings of the fifth Berkeley symposium on mathematical statistics and probability, vol. 1. Oakland, CA, USA, 281-297.

Brendan McMahan, Eider Moore, Daniel Ramage, Seth Hampson, and Blaise Aguera y Arcas. 2017. Communication-efficient learning of deep networks from decentralized data. In Artificial intelligence and statistics. PMLR, 1273-1282.

Lorenzo Minto, Moritz Haller, Benjamin Livshits, and Hamed Haddadi. 2021. Stronger Privacy for Federated Collaborative Filtering With Implicit Feedback. In Fifteenth ACM Conference on Recommender Systems. 342-350.

Khalil Muhammad, Qinqin Wang, Diarmuid O'Reilly-Morgan, Elias Tragos, Barry Smyth, Neil Hurley, James Geraci, and Aonghus Lawlor. 2020. Fedfast: Going beyond average for faster training of federated recommender systems. In Proceedings of the 26th ACM SIGKDD International Conference on Knowledge Discovery & Data Mining. 1234-1242.

Stefano Savazzi, Monica Nicoli, Mehdi Bennis, Sanaz Kianoush, and Luca Barbieri. 2021. Opportunities of federated learning in connected, cooperative, and automated industrial systems. IEEE Communications Magazine 59, 2 (2021), 16-21.

Ben Tan, Bo Liu, Vincent Zheng, and Qiang Yang. 2020. A federated recommender system for online services. In Fourteenth ACM Conference on Recommender Systems. 579-581.

Xiang Wang, Xiangnan He, Meng Wang, Fuli Feng, and Tat-Seng Chua. 2019. Neural graph collaborative filtering. In Proceedings of the 42nd international ACM SIGIR conference on Research and development in Information Retrieval. 165-174.

Chuhan Wu, Fangzhao Wu, Yang Cao, Yongfeng Huang, and Xing Xie. 2021. FedGNN: Federated graph neural network for privacy-preserving recommendation. arXiv preprint arXiv:2102.04925 (2021).

Rex Ying, Ruining He, Kaifeng Chen, Pong Eksombatchai, William L Hamilton, and Jure Leskovec. 2018. Graph convolutional neural networks for web-scale recommender systems. In Proceedings of the 24th ACM SIGKDD International conference on knowledge discovery & data mining. 974-983.

Chen Zhang, Yu Guo, Hongwei Du, and Xiaohua Jia. 2020. Pfcrowd: Privacy-preserving and federated crowdsourcing framework by using blockchain. In 2020 IEEE/ACM 28th International Symposium on Quality of Service (IWQoS). IEEE, 1-10.

Tao Qi, Fangzhao Wu, Chuhan Wu, Yongfeng Huang, and Xing Xie. 2020. Fedrec: Privacy-preserving news recommendation with federated learning. arXiv preprint arXiv:2003.09592 (2020).

* cited by examiner

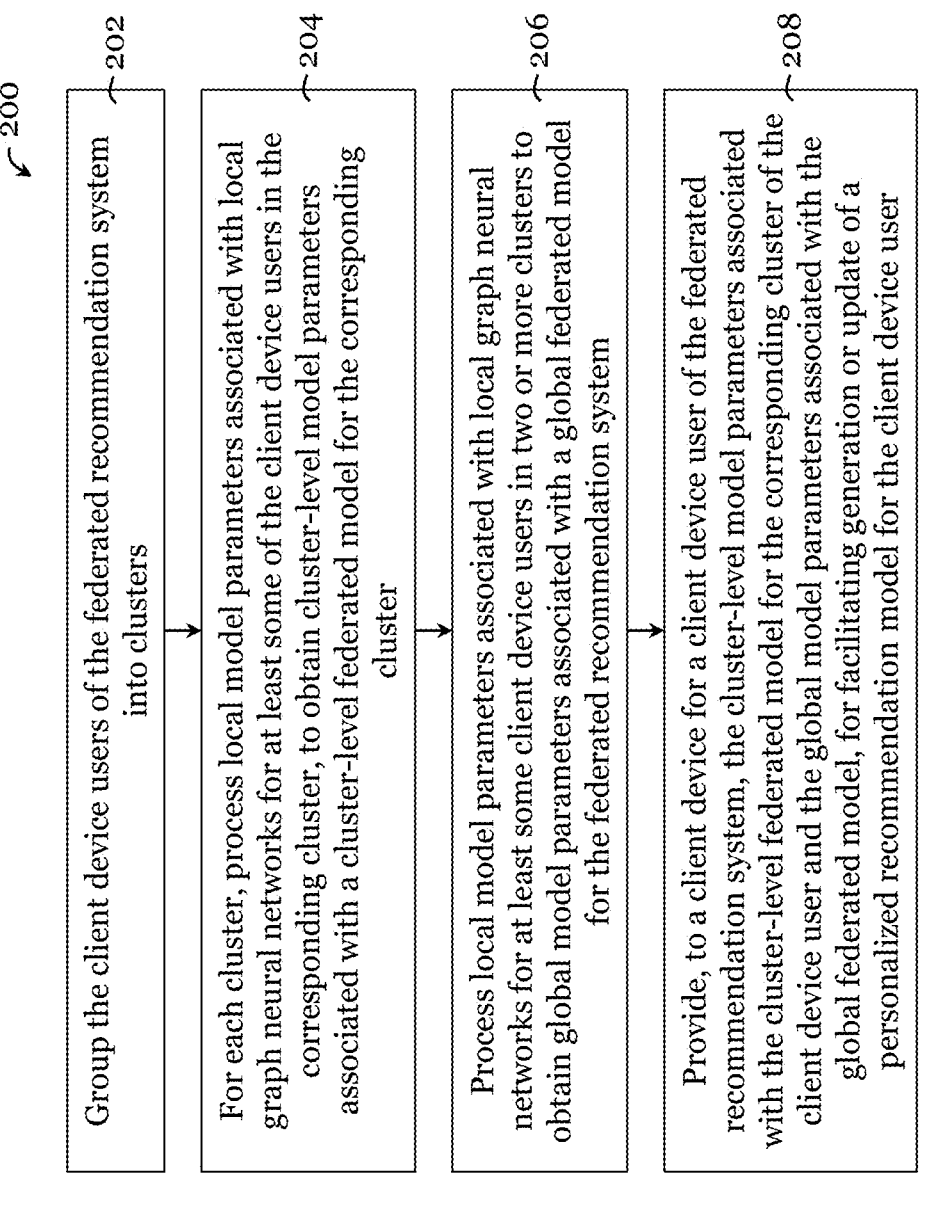

200

Group the client device users of the federated recommendation system into clusters

202

For each cluster, process local model parameters associated with local graph neural networks for at least some of the client device users in the corresponding cluster, to obtain cluster-level model parameters associated with a cluster-level federated model for the corresponding cluster

204

Process local model parameters associated with local graph neural networks for at least some client device users in two or more clusters to obtain global model parameters associated with a global federated model for the federated recommendation system

206

Provide, to a client device for a client device user of the federated recommendation system, the cluster-level model parameters associated with the cluster-level federated model for the corresponding cluster of the client device user and the global model parameters associated with the global federated model, for facilitating generation or update of a personalized recommendation model for the client device user

502 Processor

504 Memory

506 Input Device

508 Output Device

510 Communication Device

512 Disk Drive

FEDERATED RECOMMENDATION SYSTEM, DEVICE, AND METHOD

CROSS REFERENCE TO RELATED APPLICATION

This application claims the benefit of US provisional patent application No. 63/355,798, filed on 27 Jun. 2022, the entire content of which is incorporated herein by reference.

TECHNICAL FIELD

The invention generally relates to a federated recommendation system and its method of operation.

BACKGROUND

Federated recommendation applies federated learning techniques in recommendation systems to help protect user privacy, by exchanging recommendation models instead of raw user data between client devices and the server. Due to the heterogeneity in user's attributes and local data, attaining personalized recommendation is important to improve the federated recommendation performance.

SUMMARY OF THE INVENTION

In a first aspect, there is provided a computer-implemented method for operating a server of a federated recommendation system, comprising: (a) grouping a plurality of client device users of the federated recommendation system into two or more clusters; (b) for each respective one of the clusters: processing local model parameters associated with local graph neural networks for at least some of the client device users in the corresponding cluster, to obtain cluster-level model parameters associated with a cluster-level federated model for the corresponding cluster; (c) processing local model parameters associated with local graph neural networks for at least some of the client device users in each of two or more of the clusters to obtain global model parameters associated with a global federated model for the federated recommendation system; and (d) providing, to a client device for a client device user of the federated recommendation system, the cluster-level model parameters associated with the cluster-level federated model for the corresponding cluster of the client device user and the global model parameters associated with the global federated model, for facilitating generation or update of a personalized recommendation model for the client device user.

Optionally, in first aspect, the personalized recommendation model for the client device user is operable to provide a recommendation to the client device user and the recommendation may include a predicted rating or preference associated with a plurality of items.

Optionally, in first aspect, the local model parameters associated with each respective local graph neural network respectively comprise: gradients, hyperparameters, and/or learnable parameters of the corresponding local graph neural network.

Optionally, in first aspect, the cluster-level model parameters associated with each respective cluster-level federated model respectively comprise: gradients, hyperparameters, and/or learnable parameters of the corresponding cluster-level federated model.

Optionally, in first aspect, the global model parameters associated with the global federated model comprise: gradients, hyperparameters, and/or learnable parameters of the global federated model.

Optionally, in first aspect, the grouping in (a) is based on user representations of the plurality of client device users of the federated recommendation system.

Optionally, in first aspect, the grouping in (a) is performed using a k-means clustering method.

Optionally, in first aspect, in (b), for at least one of the clusters, the processing of the local model parameters is based on a weighted sum method. For example, the weighted sum method may apply one or more weightings to one or more of the local graph neural networks for the at least some of the client device users in the corresponding cluster.

Optionally, in first aspect, (b) comprises: for at least one of the clusters: processing local model parameters associated with local graph neural networks for only some of the client device users in the corresponding cluster, to obtain cluster-level model parameters associated with a cluster-level federated model for the corresponding cluster.

Optionally, in first aspect, the only some of the client device users in the corresponding cluster are selected randomly from all the client device users in the corresponding cluster.

Optionally, in first aspect, the computer-implemented method further comprises: selecting, e.g., randomly, the only some of the client device users in the corresponding cluster from all of the client device users in the corresponding cluster.

Optionally, in first aspect, (b) comprises: for each respective one of the clusters: processing local model parameters associated with local graph neural networks for only some of the client device users in the corresponding cluster, to obtain cluster-level model parameters associated with a cluster-level federated model for the corresponding cluster.

Optionally, in first aspect, the number of client device users selected for each respective one of the clusters is based on (e.g., proportional to) the total number of client device users in the corresponding cluster. For example, the number of client device users selected for each respective one of the clusters correspond to the same percentage of the total number of client device users in the corresponding cluster.

Optionally, in first aspect, the computer-implemented method further comprises: selecting, e.g., randomly, the only some of the client device users in the corresponding cluster from all of the client device users in the corresponding cluster based on (e.g., proportion to) total number of client device users in the corresponding cluster.

Optionally, in first aspect, (c) comprises: processing local model parameters associated with local graph neural networks for at least some of the client device users of the federated recommendation system in each respective one of the clusters to obtain the global model parameters associated with the global federated model for the federated recommendation system.

Optionally, in first aspect, (c) comprises: processing local model parameters associated with local graph neural networks for at least some of the client device users of the federated recommendation system in at least two of the clusters using a weighted sum method, to obtain the global model parameters associated with the global federated model for the federated recommendation system. For example, the weighted sum method may apply one or more weightings to one or more of the local graph neural networks for the at least some of the client device users of the federated recommendation system in the at least two of the clusters.

In a second aspect, there is provided a computer-implemented method for operating a client device of a federated recommendation system, comprising: (a) receiving cluster-level model parameters associated with a cluster-level federated model and global model parameters associated with a global federated model, the cluster-level federated model is for a plurality of client device users of the federated recommendation system that belong to the same cluster as the client device user, and the global federated model is for the federated recommendation system; and (b) generating or updating a personalized recommendation model for a client device user based on the cluster-level model parameters, the global model parameters, and local model parameters associated with a local graph neural network for the client device user. The personalized recommendation model is arranged to provide a recommendation to the client device user.

Optionally, in the second aspect, the recommendation comprises a predicted rating or preference associated with a plurality of items.

Optionally, in the second aspect, the cluster-level model parameters associated with the cluster-level federated model are obtained based on local model parameters associated with local graph neural networks for at least some of the client device users in the corresponding cluster.

Optionally, in the second aspect, the global model parameters associated with the global federated model are obtained based on local model parameters associated with local graph neural networks for at least some of the client device users in each of two or more of the clusters. Depending on embodiments, these local model parameters may or may not include the local model parameters associated with the local graph neural network of the client device user.

Optionally, in the second aspect, the local model parameters associated with the local graph neural network comprise: gradients, hyperparameters, and/or learnable parameters of the local graph neural network.

Optionally, in the second aspect, the cluster-level model parameters associated with the cluster-level federated model comprise: gradients, hyperparameters, and/or learnable parameters of the cluster-level federated model.

Optionally, in the second aspect, the global model parameters associated with the global federated model comprise: gradients, hyperparameters, and/or learnable parameters of the global federated model.

Optionally, in the second aspect, (b) comprises generating or updating the personalized recommendation model based on a weighted sum of: the local model parameters, the cluster-level model parameters, and the global model parameters. In some examples, this may include applying a first weighting for the local model parameters associated with the local graph neural network; applying a second weighting for the cluster-level model parameters associated with the corresponding cluster-level federated model; and applying a third weighting for the global model parameters associated with the global federated model. Two or all of the first, second, and third weightings can be the same or different.

Optionally, in the second aspect, the local graph neural network comprises graph neural network based collaborative filtering network Optionally, in the second aspect, the local graph neural network comprises a PinSage network.

Optionally, in the second aspect, the local graph neural network comprises a Neural Graph Collaborative Filtering (NGCF) network.

Optionally, in the second aspect, the local graph neural network comprises a Light Graph Convolution network (LightGCN).

In a third aspect, there is provided a computer-implemented method for operating a client device of a federated recommendation system, comprising: (a) processing user representations and item representations using a personalized recommendation model customized for a client device user of the federated recommendation system; and (b) based on the processing, providing a recommendation to the client device user. The personalized recommendation model is generated or updated based on: local model parameters associated with a local graph neural network for the client device user; cluster-level model parameters associated with a cluster-level federated model, the cluster-level federated model is for a plurality of client device users of the federated recommendation system that belong to the same cluster as the client device user; and global model parameters associated with a global federated model for the federated recommendation system. The user presentations may be user embeddings. The item representations may be item embeddings.

Optionally, in the third aspect, the recommendation comprises a predicted rating or preference associated with a plurality of items.

Optionally, in the third aspect, client device users of the federated recommendation system are grouped into two or more clusters based on user representations of the client device users. In some examples, the grouping is performed using a k-means clustering method.

Optionally, in the third aspect, the cluster-level model parameters associated with the cluster-level federated model are obtained based on local model parameters associated with local graph neural networks for at least some of the client device users in the corresponding cluster.

Optionally, in the third aspect, the global model parameters associated with the global federated model are obtained based on local model parameters associated with local graph neural networks for at least some of the client device users in each of two or more of the clusters. Depending on embodiments, these local model parameters may or may not include the local model parameters associated with the local graph neural network of the client device user.

Optionally, in the third aspect, the local model parameters associated with the local graph neural network comprise: gradients, hyperparameters, and/or learnable parameters of the local graph neural network.

Optionally, in the third aspect, the cluster-level model parameters associated with the cluster-level federated model comprise: gradients, hyperparameters, and/or learnable parameters of the corresponding cluster-level federated model.

Optionally, in the third aspect, the global model parameters associated with the global federated model comprise: gradients, hyperparameters, and/or learnable parameters of the global federated model.

Optionally, in the third aspect, the personalized recommendation model is generated or updated based generated or updated on a weighted sum of the local model parameters, the cluster-level model parameters, and the global model parameters. For example, the personalized recommendation model may be generated or updated further based on: a first weighting for the local model parameters associated with the local graph neural network, a second weighting for the cluster-level model parameters associated with the corresponding cluster-level federated model, and a third weighting for the global model parameters associated with the global federated model. Two or all of the first, second, and third weightings can be the same or different.

Optionally, in the third aspect, the computer-implemented method further comprises: processing (i) raw user representations and raw item representations of the client device user, and (ii) raw user representations and raw item representations of one or more other client device users, using the local graph neural network for the client device user, to obtain the user representations and the item representations (i.e., processing (i) and (ii) using the local graph neural network to obtain the user representations and the item representations). The raw user presentations may be raw user embeddings. The raw item representations may be raw item embeddings.

Optionally, in the third aspect, the local graph neural network comprises graph neural network based collaborative filtering network Optionally, in the third aspect, the local graph neural network comprises a PinSage network.

Optionally, in the third aspect, the local graph neural network comprises a Neural Graph Collaborative Filtering (NGCF) network.

Optionally, in the third aspect, the local graph neural network comprises a Light Graph Convolution network (LightGCN).

Optionally, in the third aspect, the computer-implemented method further comprises: processing user information of a client device user, item information associated with one or more items, and user-item interaction information associated with the client device user's interaction with the one or more items to obtain the raw user representations and the raw item representations. The user-item interaction information may include user-item interaction representations (such as embeddings).

Optionally, in the third aspect, the processing to obtain the raw user representations and the raw item representations comprises: processing the user information and the item information to obtain attribute representations; and processing the attribute representations and the user-item interaction information to obtain the raw user representations and the raw item representations.

Optionally, in the third aspect, the processing of the user information and the item information comprises: processing the user information and the item information using a model that comprises at least one linear network/layer and at least one feature crossing network/layer.

Optionally, in the third aspect, the processing of the attribute representations and the user-item interaction information comprises: processing the attribute representations and the user-item interaction information using an attention mechanism or model.

In a fourth aspect, there is provided a server for a federated recommendation system. The server comprises one or more processors, and memory storing one or more programs configured to be executed by the one or more processors, the one or more programs including instructions for performing or facilitating performing of the computer-implemented method of the first aspect. The server may include one or more server devices.

In a fifth aspect, there is provided a client device for a federated recommendation system. The client device comprises one or more processors, and memory storing one or more programs configured to be executed by the one or more processors, the one or more programs including instructions for performing or facilitating performing of the computer-implemented method of the second aspect.

In a sixth aspect, there is provided a client device for a federated recommendation system. The client device comprises one or more processors, and memory storing one or more programs configured to be executed by the one or more processors, the one or more programs including instructions for performing or facilitating performing of the computer-implemented method of the third aspect.

In a seventh aspect, there is provided a non-transitory computer-readable storage medium storing one or more programs configured to be executed by one or more processors, the one or more programs including instructions for performing or facilitating performing of the computer-implemented method of the first aspect.

In an eighth aspect, there is provided a non-transitory computer-readable storage medium storing one or more programs configured to be executed by one or more processors, the one or more programs including instructions for performing or facilitating performing of the computer-implemented method of the second aspect.

In a ninth aspect, there is provided a non-transitory computer-readable storage medium storing one or more programs configured to be executed by one or more processors, the one or more programs including instructions for performing or facilitating performing of the computer-implemented method of the third aspect.

In a tenth aspect, there is provided a federated recommendation system. The federated recommendation system may include the server of the first aspect, one or more of the client device of the second aspect, and/or one or more of the client device of the third aspect. In some examples, one or more client device may be operable as the client device of the second aspect and the client device of the third aspect.

In an eleventh aspect, there is provided a method for operating a federated recommendation system, comprising: grouping a plurality of client devices into two or more clusters; processing (e.g., aggregating) respective information descriptive of (e.g., local gradients of) local graph neural networks of (e.g., received from) at least some of the plurality of client devices based on the clusters, to obtain respective information descriptive of (e.g., cluster-level gradients of) a plurality of cluster-level federated models; processing (e.g., aggregating) respective information descriptive of (e.g., local gradients of) local graph neural networks of (e.g., received from) at least some of the plurality of client devices to obtain information descriptive of (e.g., global gradients of) a global federated model; and providing the information descriptive of (e.g., global gradients of) the global federated model and the information descriptive of (e.g., cluster-level gradients of) the corresponding cluster-level federated model to at least one of the plurality of client devices based on the cluster to which the client device belongs, to facilitate creation or update of respective recommendation model at the at least one client device.

Optionally, in the eleventh aspect, the grouping of the plurality of client devices into the two or more clusters is based on respective user representations of the plurality of client devices.

Optionally, in the eleventh aspect, the grouping of the plurality of client devices into the two or more clusters is based on respective user embeddings, or gradients of user embeddings, of (e.g., received from) the plurality of client devices.

Optionally, in the eleventh aspect, for each of the client devices, the user embeddings or gradients of user embeddings of the client device are obtained by processing local user embeddings and local item embeddings of the client device, and local user embeddings and local item embeddings of one or more other client devices, using a local graph neural network at the client device.

Optionally, in the eleventh aspect, for each of the client devices, the local user embeddings and local item embeddings of the client device are obtained based on user attribute information at the client device, item attribute information at the client device, and user-item interaction information at the client device.

Optionally, in the eleventh aspect, the grouping of the plurality of client devices into the two or more clusters is based on k-means clustering.

Optionally, in the eleventh aspect, the processing (e.g., aggregating) comprises processing (e.g., aggregating) respective local gradients of local graph neural networks of all of the plurality of client devices based on the clusters, to obtain respective cluster-level gradients of the plurality of cluster-level federated models.

Optionally, in the eleventh aspect, the processing (e.g., aggregating) comprises processing (e.g., aggregating) respective local gradients of local graph neural networks of all of the plurality of client devices to obtain the global gradients of the global federated model.

Optionally, in the eleventh aspect, the method further comprises: selecting, for each of the clusters, one or more and not all client devices of the corresponding cluster; and processing the local gradients of local graph neural networks of the selected one or more and not all client devices to obtain cluster-level gradients of the cluster-level federated model of the corresponding cluster.

Optionally, in the eleventh aspect, the method further comprises: selecting, for each of the clusters, one or more and not all client devices of the corresponding cluster; and processing the local gradients of local graph neural networks of the selected one or more and not all client devices to obtain global gradients of the global federated model.

Optionally, in the eleventh aspect, the number of client devices selected is related to (e.g., increases with, proportional to, etc.) the total number of client devices in the corresponding cluster.

Optionally, in the eleventh aspect, the method further comprises: obtaining cluster-level gradients of each of the cluster-level federated model based on a weighted sum of local gradients of all participating client devices in the cluster.

Optionally, in the eleventh aspect, the method further comprises: obtaining global gradients of each of the global federated model based on a weighted sum of local gradients of all participating client devices.

The method of the eleventh aspect may be performed by a server of the federated recommendation system.

In a twelfth aspect, there is provided a method for operating federated recommendation system, comprising: processing information descriptive of (e.g., local gradients of) a local model, information descriptive of (e.g., global gradients of) a global federated model, and information descriptive of (e.g., cluster-level gradients of) a corresponding cluster-level federated model to obtain a recommendation model, the recommendation model being arranged to predict or provide recommendation based on a user input received at the client device. The information descriptive of (e.g., global gradients of) the global federated model is obtained based on information descriptive of (e.g., local gradients of) local graph neural networks of at least some of a plurality of client devices, and the information descriptive of (e.g., cluster-level gradients of) the corresponding cluster-level federated model is obtained based on information descriptive of (e.g., local gradients of) local graph neural networks of at least some of a plurality of client devices in the corresponding cluster. The information descriptive of (e.g., global gradients of) the global federated model and information descriptive of (e.g., cluster-level gradients of) a corresponding cluster-level federated model may be received from a server.

Optionally, in the twelfth aspect, the method further comprises applying a weighting to the local gradients of a local model, a weighting to the global gradients of the global federated model, and/or a weighting to the cluster-level gradients of the corresponding cluster-level federated model. The weighting(s) can take any value. The weightings may be the same or different.

Optionally, in the twelfth aspect, the method further comprises applying a local differential privacy method to the local gradients of the local graph neural network before providing the local gradients to the server.

Optionally, in the twelfth aspect, the method further comprises processing user attribute information at the client device, item attribute information at the client device, and user-item interaction information at the client device to obtain local user embeddings and local item embeddings of the client device.

Optionally, in the twelfth aspect, the method further comprises processing the local user embeddings and local item embeddings of the client device, and local user embeddings and item embeddings of one or more other client devices, using a local graph neural network at the client device to obtain (i) user embeddings or gradients of user embeddings of the client device and (ii) item embeddings or gradients of item embeddings of the client device.

The method of the twelfth aspect may be performed by a client device of the federated recommendation system.

In a thirteenth aspect, there is provided a server for a federated recommendation system. The server comprises one or more processors, and memory storing one or more programs configured to be executed by the one or more processors, the one or more programs including instructions for performing or facilitating performing of the method of the eleventh aspect.

In a fourteenth aspect, there is provided a client device for a federated recommendation system. The client device comprises one or more processors, and memory storing one or more programs configured to be executed by the one or more processors, the one or more programs including instructions for performing or facilitating performing of the method of the twelfth aspect.

In a fifteenth aspect, there is provided a non-transitory computer-readable storage medium storing one or more programs configured to be executed by one or more processors, the one or more programs including instructions for performing or facilitating performing of the method of the eleventh aspect.

In a sixteenth aspect, there is provided a non-transitory computer-readable storage medium storing one or more programs configured to be executed by one or more processors, the one or more programs including instructions for performing or facilitating performing of the method of the twelfth aspect.

In a seventeenth aspect, there is provided a federated recommendation system comprising: a server of the thirteenth aspect, and at least one client device of the fourteenth aspect.

The number of client device users and the number of client devices can be the same or different. In some implementations, each client device has one client device user. In some implementations, the same client device user can two or more different client devices.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which:

FIG. 3 is a flowchart illustrating a method for operating a server of a federated recommendation system in some embodiments of the invention;

DETAILED DESCRIPTION

Figure 1:
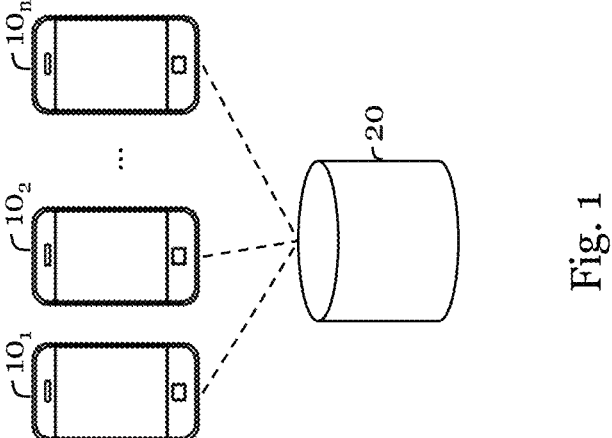
FIG. 1 is a schematic diagram of an operation environment of a federated recommendation system in some embodiments of the invention.

FIG. 1 illustrates an operation environment of a federated recommendation system in some embodiments of the invention. The operation environment generally includes multiple (n) client devices $10_1$-$10_n$ (n≥2) and a server 20 in communication with the client devices $10_1$-$10_n$. The server 20 can be formed by any number of server device (one or more). Each of the client devices $10_1$-$10_n$ may communicate with the server 20 via respective one or more wired communication link(s) and/or one or more wireless communication link(s), for communicating data and information (e.g., representations, embeddings, models, model parameters, etc.), to facilitate operation of the federated recommendation system. The client devices $10_1$-$10_n$ may each be configured to receive user input and provide recommendation or prediction based on the received user input. In some embodiments, one or more of the client devices $10_1$-$10_n$ is each associated with a respective one client device user. In some embodiments, one or more of the client devices $10_1$-$10_n$ is each associated with more than one client device users. In some embodiments, the same client device user can use more than one of the client devices $10_1$-$10_n$, at the same time or at different times. Each client device user may have or may own one or more federated recommendation models.

Figure 2:
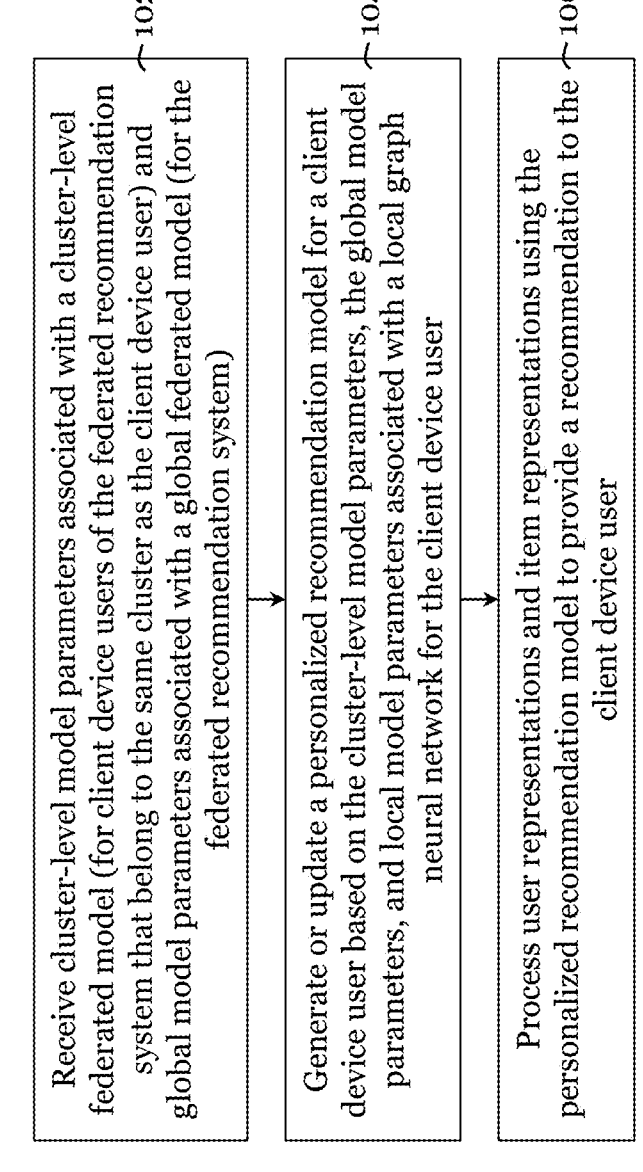
FIG. 2 is a flowchart illustrating a method for operating a client device of a federated recommendation system in some embodiments of the invention.

FIG. 2 illustrates a method 100 for operating a client device of a federated recommendation system in some embodiments of the invention. The method 100 may be used for operating a client device such as one or more of the client devices $10_1$-$10_n$. For example, the method 100 may be performed in each of the client devices $10_1$-$10_n$. The method 100 may be used for operating one or more other client devices.

The method 100 is for operating a client device for a client device user of the federated recommendation system. The method 100 may be performed at the client device for the client device user. The client device users of the federated recommendation system are grouped into two or more clusters (i.e., clusters of users) based on user representations (e.g., user embeddings) of the client device users. The grouping may be performed using various clustering method such as the k-means clustering method.

The method 100 begins in step 102, in which the client device for the client device user receives: cluster-level model parameters associated with a cluster-level federated model and global model parameters associated with a global federated model. The cluster-level federated model is a federated model is for multiple (e.g., all) client device users of the federated recommendation system, which belong to the same cluster as the client device user (i.e., these multiple client device users and the client device user belong to the same cluster of users). The global federated model is a federated model that is for multiple (e.g., all) client device users of the federated recommendation system, which include client device users from different clusters of users). In some embodiments, the cluster-level model parameters associated with the cluster-level federated model are obtained based on local model parameters associated with local graph neural networks for at least some client device users in the same cluster (each of these at least some client device users have a respective local graph neural network with respective local model parameters). In some embodiments, the global model parameters associated with the global federated model are obtained based on local model parameters associated with local graph neural networks for at least some client device users in two or more different clusters (each of these at least some client device users have a respective local graph neural network with respective local model parameters).

In step 104, the method 100 includes generating or updating a personalized recommendation model for the client device user based on the cluster-level model parameters, the global model parameters, and local model parameters associated with a local graph neural network for the client device user.

The personalized recommendation model is arranged to provide a recommendation to the client device user, e.g., to provide to the client device user a predicted rating or preference associated with multiple items. In some embodiments, the personalized recommendation model is generated or updated based on a weighted sum of the cluster-level model parameters, the global model parameters, and the local model parameters associated with the local graph neural network for the client device user.

In step 106, the method 100 includes processing user representations (e.g., user embeddings) and item representations (e.g., item embeddings) using the personalized recommendation model to provide a recommendation to the client device user, e.g., to provide to the client device user a predicted rating or preference associated with multiple items. In some embodiments, the user representations (e.g., user embeddings) and the item representations (e.g., item embeddings) used in step 106 may be obtained by processing, using the local graph neural network for the client device user, raw user representations (e.g., raw user embeddings) and raw item representations (e.g., raw item embeddings) of the client device user as well as raw user representations and raw item representations of one or more other client device users. In some embodiments, the raw user representations (e.g., raw user embeddings) and raw item representations (e.g., raw item embeddings) of the client device user may be obtained by processing user information of the client device user, item information associated with one or more items, and user-item interaction information (user-item interaction representations, such as embeddings) associated with the client device user's interaction with the one or more items. In some embodiments, the processing to obtain the raw user representations and the raw item representations include: (i) processing the user information and the item information, e.g., using a model that comprises at least one linear network/layer and at least one feature crossing network/layer, to obtain attribute representations, and (ii) processing the attribute representations and the user-item interaction information, e.g., using an attention mechanism or model, to obtain the raw user representations and the raw item representations.

In method 100, respective local model parameters associated with each respective local graph neural network (for the client device user or any other client device users) may include: gradients, hyperparameters, and/or learnable parameters of the corresponding local graph neural network. Respective cluster-level model parameters associated with each respective cluster-level federated model may include: gradients, hyperparameters, and/or learnable parameters of the corresponding cluster-level federated model. The global model parameters associated with the global federated model may include: gradients, hyperparameters, and/or learnable parameters of the global federated model. In some embodiments the local graph neural network includes a graph neural network based collaborative filtering network. For example, the local graph neural network may include: a PinSage network, a Neural Graph Collaborative Filtering (NGCF) network, a Light Graph Convolution network (LightGCN), etc.

The method may be performed by any client device associated with the client device users of the federated recommendation system.

FIG. 3 illustrates a method 200 for operating a server of a federated recommendation system in some embodiments of the invention. The method 200 may be used for operating a server such as the server 20. The method 200 may be performed at the server of the federated recommendation system. The federated recommendation system may have multiple client device users and/or multiple client devices for the client device users.

The method 200 begins in step 202, in which the client device users of the federated recommendation system are grouped (e.g., clustered) into two or more clusters. The grouping or clustering may be based on user representations (e.g., user embeddings) of the client device users. The grouping or clustering may be performed using a k-means clustering method.

In step 204, for each respective cluster, the method 200 includes processing local model parameters associated with local graph neural networks for at least some of the client device users in the corresponding cluster (each of these at least some client device users have a respective local graph neural network with respective local model parameters), to obtain cluster-level model parameters associated with a cluster-level federated model for the corresponding cluster. As a result, multiple cluster-level federated models, one for each cluster, is obtained. In some embodiments, in step 204, for each of one or more of the clusters, the respective processing of the local model parameters is based on a weighted sum method, e.g., to apply one or more weightings to one or more of the local graph neural networks for the at least some of the client device users in the corresponding cluster. In some embodiments, in step 204, for each of one or more of the clusters, the method 200 processes local model parameters associated with local graph neural networks for only some (i.e., not all) of the client device users in the corresponding cluster, to obtain cluster-level model parameters associated with a cluster-level federated model for the corresponding cluster. These some (i.e., not all) client device users may be selected randomly from all the client device users in the corresponding cluster. In some embodiments, in step 204, for each of the clusters, the method 200 processes local model parameters associated with local graph neural networks for only some (i.e., not all) of the client device users in the corresponding cluster, to obtain cluster-level model parameters associated with a cluster-level federated model for the corresponding cluster. In some embodiments, the number of client device users selected for each respective one of these clusters is based on (e.g., increases with, proportional to) the total number of client device users in the corresponding cluster. For example, the number of client device users selected for each respective one of these clusters correspond to the same percentage of the total number of client device users in the corresponding cluster. The some (i.e., not all) client device users for each respective one or these clusters may be selected randomly from all the client device users in the corresponding cluster.

In step 206, the method 200 includes processing local model parameters associated with local graph neural networks for at least some of the client device users in each of two or more of the clusters (each of these at least some client device users have a respective local graph neural network with respective local model parameters), to obtain global model parameters associated with a global federated model for the federated recommendation system. In some embodiments, in step 206, the method 200 processes local model parameters associated with local graph neural networks for at least some of the client device users of the federated recommendation system in each respective one of the clusters, to obtain the global model parameters associated with the global federated model for the federated recommendation system. In some embodiments, in step 206, the method 200 processes local model parameters associated with local graph neural networks for at least some of the client device users of the federated recommendation system in at least two of the clusters to obtain the global model parameters associated with the global federated model for the federated recommendation system. The processing may be based on a weighted sum method, which applies one or more weightings to one or more of the local graph neural networks for the at least some of the client device users of the federated recommendation system in the at least two of the clusters.

In step 208, the method 200 includes providing, to a client device for a client device user of the federated recommendation system: the cluster-level model parameters associated with the cluster-level federated model for the corresponding cluster of the client device user and the global model parameters associated with the global federated model, for facilitating generation or update of a personalized recommendation model for the client device user. The personalized recommendation model may be operable to provide a recommendation, e.g., a predicted rating or preference associated with multiple items. The method 200 may perform step 208 for each of the client devices or client device users of the federated recommendation system, to facilitate generation or update of respective personalized recommendation model for respective client device user of the federated recommendation system.

In method 200, respective local model parameters associated with each respective local graph neural network (for the client device user or any other client device users) may include: gradients, hyperparameters, and/or learnable parameters of the corresponding local graph neural network. Respective cluster-level model parameters associated with each respective cluster-level federated model may include: gradients, hyperparameters, and/or learnable parameters of the corresponding cluster-level federated model. The global model parameters associated with the global federated model may include: gradients, hyperparameters, and/or learnable parameters of the global federated model. In some embodiments the local graph neural network includes a graph neural network based collaborative filtering network. For example, the local graph neural network may include: a PinSage network, a Neural Graph Collaborative Filtering (NGCF) network, a Light Graph Convolution network (LightGCN), etc.

The method wo and the method 200 may be performed by client devices and server in the same federated recommendation system.

A more specific example implementation of the method 100, 200 will now be described with reference to FIG. 4, which shows a federated recommendation framework in one embodiment of the invention.

Inventors of the present invention have, through their research, appreciated that federated recommendation can help users filter out useful information while keeping users' personal data private. Inventors of the present invention have further appreciated that following the principles in federated learning (e.g., in B. McMahan et al., Communication-Efficient Learning of Deep Networks from Decentralized Data (2017)), federated recommendation exchanges recommendation models, instead of raw data, between user devices and the central server, and that the distributed learning paradigm has found applications in content recommendations, mobile crowdsourcing task recommendations, autonomous driving strategy recommendations, etc.

Inventors of the present invention have, through their research, become aware that several classic recommendation algorithms have been extended to the federated setting. Some examples include federated collaborative filtering (e.g., in M. Amad-Ud-Din et al., Federated collaborative filtering for privacy-preserving personalized recommendation system (2019); and L. Minto et al., Stronger Privacy for Federated Collaborative Filtering With Implicit Feedback (2021)), federated matrix factorization (e.g., in D. Chai et al., Secure federated matrix factorization (2020); Y. Du et al., Federated matrix factorization for privacy-preserving recommender systems (2021); and Z. Li et al., Federated matrix factorization with privacy guarantee (2021)), and federated graph neural networks (GNN) (e.g., in C. Wu et al., FedGNN: Federated graph neural network for privacy-preserving recommendation (2021), the entire contents of which is incorporated herein by reference).

Inventors of the present invention have realized that these existing techniques may have the following drawbacks. First, these existing techniques use the same aggregated recommendation model for all of the users of the system, hence ignored the heterogeneity of the users (e.g., non-IID data distribution, different levels of computing resources). Second, these existing techniques require model exchanges between the server and all of the users of the system for federated learning, which may have high communication burden.

To address one or more of these issues, in this embodiment, there is provided a graph neural network based Personalized Federated Recommendation (PerFedRec) framework. In this embodiment, PerFedRec learns user representations from user/item attributes and collaborative information (i.e., user-item interaction) via a graph neural network (GNN), and group similar users into clusters based on user representation. Then, each cluster attains a cluster-level federated recommendation model, and the server attains a global model. Further, each user combines its local model, the cluster-level model, and the global model to obtain a personalized model. In this embodiment, the representation learning, user clustering, and model adaptation are done jointly, not independently.

In addition to personalization, the PerFedRec framework in this embodiment also alleviates the communication burden by picking only some (a few representative) clients in each cluster in the training of the global model. This "user dropout" could reduce communication burden and/or save communication cost in critical scenarios, such as (autonomous) driving strategy recommendations where communication bandwidth is rather limited and long time delay is prohibitive.

One feature of the PerFedRec framework in this embodiment is that a joint representation learning, user clustering, and model adaptation framework in federated recommendation is used to achieve personalized recommendation, which adapts to the heterogeneity of users' local data and resources. The representations, learned by a GNN from users' collaborative and attribute information, are helpful to cluster similar users and learn personalized models. Another feature of the PerFedRec framework in this embodiment is that only some (e.g., a few representative) users are selected from each cluster to participate in training. This approach may reduce communication costs, and may be especially suitable for applications with limited bandwidth and has low latency requirement (i.e., cannot have substantial time delay).

This embodiment considers a federated recommendation system consisting of a server and N distributed users $(\mathbf{10}_1, \ldots, \mathbf{10}_n, \ldots, \mathbf{10}_N)$, each with a $d_{ua}$-dimensional attribute $u_n \in \mathbb{R}^{d_{ua}}$, $\forall n \in [N]$. There are M items, each with a $d_{ia}$-dimensional attribute $u_m \in \mathbb{R}^{d_{ia}}$, $\forall n \in [M]$, to be recommended in the system. Each user has some historical interactions with items (e.g., viewing/clicking the news, rating the items). However, the users' historical interactions and attributes cannot be observed by the server due to users' privacy concerns. As such, only recommendation models, instead of user data, can be exchanged between the server and user devices. Under such constraints, the system aims to train personalized recommendation models for different users.

In this embodiment, the PerFedRec framework includes a user-side end-to-end local recommendation network and a server-side clustering based aggregator. FIG. 4 shows the overall architecture of the PerFedRec framework.

In respect of user-side local recommendation network, the user-side local recommendation network includes: a raw embedding module 10A, a local GNN module 10B, and a personalized prediction module 10C.

Figure 4:
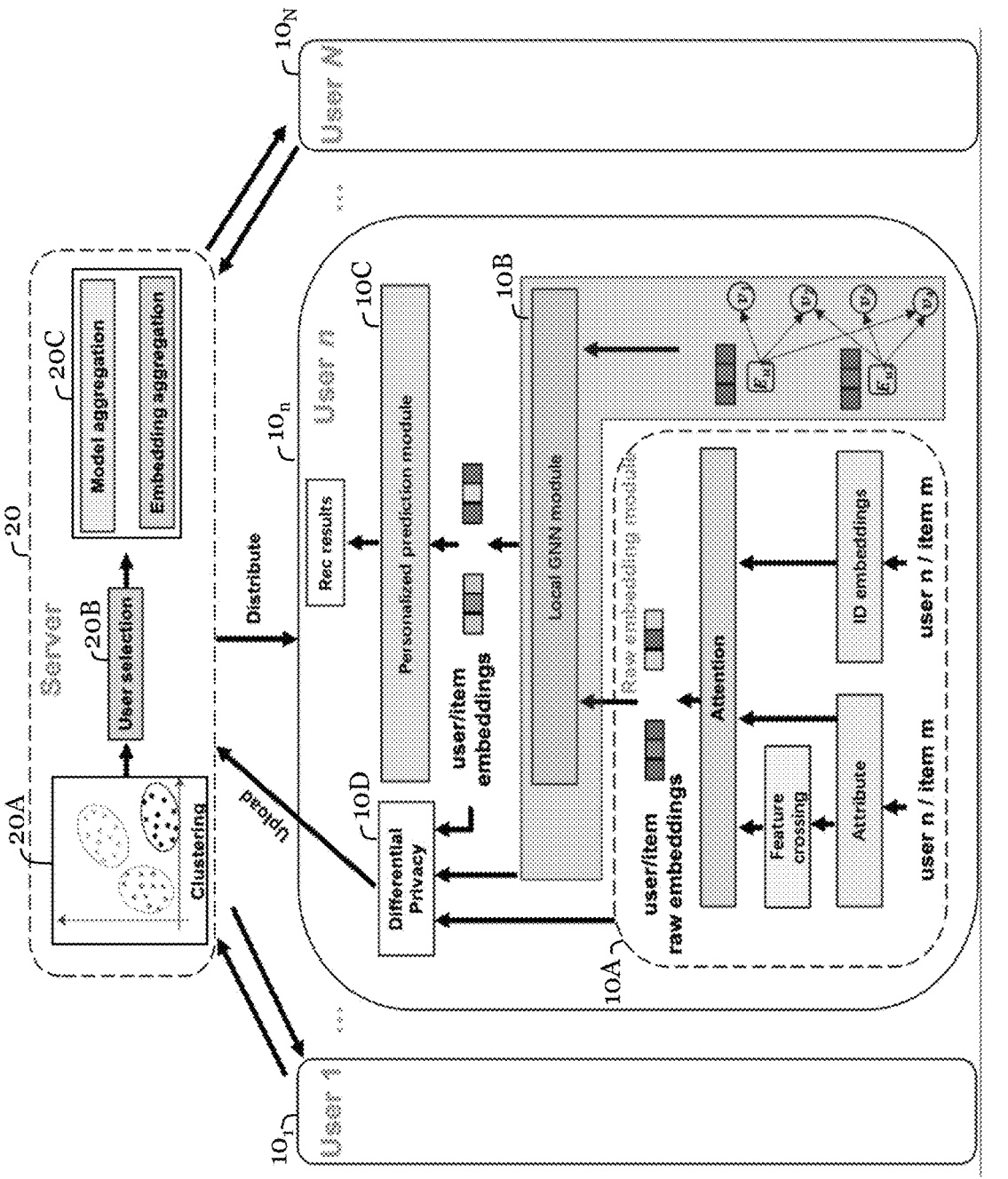
FIG. 4 is a schematic diagram of a federated recommendation framework in one embodiment of the invention.

Referring to FIG. 4, the raw embedding module 10A in this embodiment pre-processes user and item attributes. Via an attention mechanism, it combines attribute information with collaborative information (i.e., user-item interactions) to generate inputs to the local GNN module. Formally, the collaborative information for user n and item m is denoted by a d-dimensional ID embedding $E_{idu,n} \in \mathbb{R}^d$ and $E_{idi,m} \in \mathbb{R}^d$, respectively. These embeddings are initialized randomly and updated based on user-item interactions during training. The attributes of user n and item m are passed through a linear layer and a feature crossing layer to generate the attribute embeddings $E_{fcu,n} \in \mathbb{R}^d$ and $E_{fci,m} \in \mathbb{R}^d$, respectively:

$$E_{fu,n} = W_{fu,n} u_n + b_{fu,n}$$

$$E_{fi,m} = W_{fi,m} v_m + b_{fi,m}$$

$E_{fcu,n}$=FeatureCrossing($E_{fu,n}$)

$E_{fci,m}$=FeatureCrossing($E_{fi,m}$)    (1)

where $W_{fu,n}$, $b_{fu,n}$, $W_{fi,m}$, $b_{fi,m}$ are network parameters of the linear layer, and FeatureCrossing($x_0$) is the feature crossing network that mixes the information in $x_0$ across dimensions. The feature crossing network consists of L feature crossing layers and the output $x_{l+1} \in \mathbb{R}^d$ of layer l+1 is obtained by $x_{l+1} = x_0 x_l^T w_l + b_l + x_l$, where $x_l \in \mathbb{R}^d$ is the output of layer l, and $w_l$, $b_l \in \mathbb{R}^d$ are parameters of layer l.

After obtaining these cross feature embeddings of attributes, an attention network is used to incorporate the attribute into the collaborative information:

$E_{attu,n}$=Attention($E_{fu,n}$,$E_{fcu,n}$,$E_{idu,n}$)

$E_{atti,m}$=Attention($E_{fi,m}$,$E_{fci,m}$,$E_{idi,m}$)    (2)

where Attention( ) is the attention mechanism. One example of the attention mechanism is:

$$\text{Attention}(x_1, x_2, \dots, x_k) = \sum_{i=1}^{k} \frac{\exp(\tanh(W_i x_i + b_i))}{\sum_{i'=1}^{k} \exp(\tanh(W_{i'} x_{i'}, + b_{i'}))} x_i. \quad (3)$$

In this embodiment, all the above embeddings are concatenated as the raw embeddings for user n and item m: $E_{rawu,n}$ and $E_{rawi,m}$.

In this embodiment, item embeddings are shared and updated iteratively among users via the server, while the raw user embeddings are kept locally due to privacy concerns. These raw initial embeddings are used to train the local GNNs. As the training process iterates, the global item embeddings and local user embeddings will be updated.

Referring to FIG. 4, the local GNN module 10B in this embodiment operates as follows.

After obtaining all items' embeddings and the user's own embedding, each user needs the user-item interaction matrix to train the local GNN model. However, one difficulty is that user-item interaction information is kept private as local data and should not be shared among the server and other users.

To tackle such issues, we follow a similar idea as in C. Wu et al., FedGNN: Federated graph neural network for privacy-preserving recommendation (2021), the entire contents of which is incorporated herein by reference. Specifically, each user uploads the privacy-protected embedding and the encrypted IDs (with the same encryption for all users) of the items that this user has interaction with to the server. Then the server ends encrypted item IDs and user embeddings back to all the users. In some examples, to further reduce the communication cost, the server can send back the encrypted item ID and the other users' embeddings only to a user that has previously interacted with this item. Therefore, each user is able to obtain several users' embedding information together with the corresponding items, without revealing the identities of these users. In this way, each user could explore its neighbourhood users and expand a local interaction graph.

The GNN module 10B will output user n's embedding $E_{u,n}$ and items' embeddings $\{E_{i,m}\}$:

$E_{u,n}$,$E_{i,m}$=LocalGNN($\{E_{rawu,n}\}$,$\{E_{rawi,m}\}$).    (4)

These embeddings can be fed into the personalized prediction network of the personalized prediction module 10C for rating/preference predictions.

For example, the GNN module 10B may make use of any of the following: GNN module, such as PinSage (e.g., in R.

Ying et al., Graph convolutional neural networks for web-scale recommender systems (2018)), NGCF (e.g., in X. Wang et al., Neural graph collaborative filtering (2019)), LightGCN (X. He et al., LightGCN: Simplifying and powering graph convolution network for recommendation (2020)), etc.

Referring to FIG. 4, the personalized prediction module 10C in this embodiment operates as follows.

To achieve personalized recommendation, the framework in this embodiment trains personalized recommendation models for each user. Denote by $\theta_{local,n}^t$ the (raw embedding and GNN) model trained by user n at time step t. From the server side, there are a global federated model $\theta_{global}^t$ and a cluster-level federated model $\theta_{C(n)}^t$, where C(n) is the cluster containing user n. The obtaining of the global and the cluster-level models will be described below. In this embodiment, the personalized model combines these three models together via weights $\alpha_{n,1}$, $\alpha_{n,2}$, $\alpha_{n,3}$, which can be either hyperparameters or learnable parameters:

$\theta_n^t = \alpha_{n,1} \theta_{local,n}^t + \alpha_{n,2} \theta_{C(n)}^t + \alpha_{n,3} \theta_{global}^t.$    (5)

After obtaining the embeddings, an additional linear layer or a dot multiplication of the user and item embeddings could be used to obtain the rating prediction.

The framework in this embodiment also includes a privacy preserving module 10D that uses privacy-preserving techniques when transmitting user-side models to the server. In this embodiment the local differential privacy mechanism is adopted to protect the privacy of transmitted models.

In respect of server-side clustering based federation, the server-side federation module in this embodiment has three modules: user clustering module 20A, user selection module 20B, and parameter aggregation module 20C. At each iteration, encrypted and privacy protected user/item embeddings and models are uploaded to the server by the users/user devices.

Referring to FIG. 4, the user clustering module 20A operates as follows. Based on user embeddings $E_{u,n}$, the server clusters users into K groups. User n belongs to cluster C(n). Clustering method such as K-means clustering method (e.g., as in J. MacQueen et al., Some methods for classification and analysis of multivariate observations (1967)), can be used. Since the node representation $E_{u,n}$ is jointly learned from the attribute and collaborative information at each user, the representation is therefore enhanced.

Referring to FIG. 4, the user selection module 20B operates as follows. To reduce the communication cost in critical conditions, the framework in this embodiment has an optional cluster-based user selection ability. Within each cluster, the framework can adaptively select a few random users (e.g., the number of users may be proportional to the cluster size), to participate in the model aggregation in each iteration.

Referring to FIG. 4, the parameter aggregation module 20C operates as follows. The framework in this embodiment performs both network model aggregation and embedding aggregation. The user embedding is stored at the local user device but may get exchanged via the server without revealing the user identity. Item embeddings are shared and updated by all clients. For network models, the server will aggregate a global model $\theta_{global}^t$ (via a weighted sum of all participating users) and cluster-wise models $\theta_{C_k}^t$ for cluster $C_k$ (via a weighted sum of all participating users in the cluster). The global model $\theta_{global}^t$ and a cluster-level model $\theta_{C(n)}^t$ will be given to user n for personalized recommendation.

Experiments are performed using over real-world datasets to show the effectiveness of the PerFedRec framework in this embodiment. The performance of the PerFedRec framework in this embodiment is compared with the performance of some existing baseline methods.

To evaluate the PerFedRec framework in this embodiment, experiments are conducted on the three real-world datasets (MovieLens-100k, Yelp, Kindle). The statistics of the three real-world datasets can be found in Table 1. MovieLens is a movie rating dataset that is commonly used for evaluating recommendation algorithms. MovieLens-look, which includes 100,000 user ratings, is used in this example. Yelp is another commonly used benchmark dataset. Kindle is from the Amazon review data for recommending e-books to users. The datasets are available at:

MovieLens: https://grouplens.org/datasets/movielens/
Yelp: https://www.yelp.com/dataset/challenge
Kindle: https://jmcauley.ucsd.edu/data/amazon/

TABLE 1

Dataset description

| Dataset | # of user | # of item | # of rating | sparsity |
|---|---|---|---|---|
| MovieLens | 943 | 1,682 | 100,000 | 93.70% |
| Yelp | 5,224 | 7,741 | 123,024 | 99.70% |
| Kindle | 7,650 | 9,173 | 137,124 | 99.80% |

The operation of the PerFedRec framework in this embodiment is compared with the operation of the FedGNN framework (in C. Wu et al., FedGNN: Federated graph neural network for privacy-preserving recommendation (2021))

The FedGNN framework is a federated recommendation framework that uses the FedAvg algorithm (e.g., as in B. McMahan et al., Communication-Efficient Learning of Deep Networks from Decentralized Data (2017)). PerFedRec in this embodiment is designed to improve FedAvg by clustering users and making personalized recommendations.

The operation of the PerFedRec framework in this embodiment is also compared with the operation of a centralized version. However, as the experiments are conducted in a federated setting, some classical recommendation algorithms are left out as they cannot be readily adapted to the federated setting.

In the experiments, a lightweight model named Light-GCN (e.g., as in X. He et al., LightGCN: Simplifying and powering graph convolution network for recommendation (2020)) is used as the GNN model, and dot product is used to implement the rating predictor. The user and item embeddings and their hidden representations learned by graph neural networks are 64-dimensional. Following the disclosure in M. Deshpande et al., Item-based top-n recommendation algorithms (2004), the leave-one-out strategy is applied for evaluation, and HR@K and NDCG@K are employed to evaluate the performance. For each user, the last (previous) behaviour is used for testing, the second last for validation, and the others for training. Similar to the disclosure in A. M. Elkahky, et al., A multi-view deep learning approach for cross domain user modeling in recommendation systems (2015) and K. Muhammad et al., Fedfast: Going beyond average for faster training of federated recommender systems (2020), 100 items that have no interaction with the user are randomly sampled, and the test item is ranked among these items. In the experiments, the number of users used in each round of model training is 128, and the default learning rate is 0.01. The hyperparameters $\alpha_{n,1}$, $\alpha_{n,2}$, $\alpha_{n,3}$ are set to $\frac{1}{3}$. The hyperparameters (e.g., learning rate, dropout rate) of baseline methods are selected according to the best performance on the validation set. The performance is averaged over 5 runs on the testing set.

Table 2 shows the performance of all three methods (Centralized, FedAvg, and PerFedRec in this embodiment) on the three datasets. As shown, the centralized method achieves the best results in almost all scenarios whereas FedAvg achieves the worst results on all scenarios since it ignores the feature information and does not provide personalized recommendation.

The performance of PerFedRec is close to the centralized method in most cases. Compared to FedAvg, PerFedRec achieves an improvement of 29.47% in terms of HR@10 on average over all three datasets and 57.67% in terms of NDCG@10 on average over all three datasets. The improvement (43.79% on average) is the most significant on the MovieLens dataset. The improvement is smaller for sparser datasets such as Kindle while still achieving 19.40% on average. In particular, the improvement on the Kindle dataset, which does not have external feature information, shows the importance of personalized recommendations.

TABLE 2

Performance comparison
(improv. represents the performance
improvement of PerFedRec over FedAvg)

| | | Centralized | FedAvg | PerFedRec | Improv. |
|---|---|---|---|---|---|
| MovieLens | HR@10 | 0.6532 | 0.4475 | 0.6119 | 36.74% |
| | NDCG@10 | 0.4337 | 0.2462 | 0.4409 | 79.08% |
| | HR@20 | 0.8165 | 0.6405 | 0.7402 | 15.57% |
| | NDCG@20 | 0.4740 | 0.2954 | 0.4707 | 59.34% |
| Yelp | HR@10 | 0.6497 | 0.4422 | 0.6058 | 36.99% |
| | NDCG@10 | 0.4099 | 0.2487 | 0.4040 | 62.44% |
| | HR@20 | 0.8168 | 0.6437 | 0.7151 | 11.09% |
| | NDCG@20 | 0.4531 | 0.3000 | 0.4317 | 43.90% |
| Kindle | HR@10 | 0.6382 | 0.3936 | 0.4514 | 14.68% |
| | NDCG@10 | 0.4102 | 0.2366 | 0.3111 | 31.49% |
| | HR@20 | 0.7742 | 0.5218 | 0.5548 | 6.32% |
| | NDCG@20 | 0.4448 | 0.2701 | 0.3379 | 25.10% |

The impact of a key hyperparameter, the number of clusters K during model training, is studied.

Table 3 indicates that the performance is relatively stable under varying hyperparameters, which reduces the burden of hyperparameter tuning.

TABLE 3

Performance under different # of clusters K on MovieLens dataset

| # of clusters | HR@10 | NDCG@10 | HR@20 | NDCG@20 |
|---|---|---|---|---|
| K = 5 | 0.6119 | 0.4409 | 0.7402 | 0.4707 |
| K = 10 | 0.6214 | 0.4492 | 0.7470 | 0.4799 |
| K = 20 | 0.6087 | 0.4404 | 0.7328 | 0.4699 |

An ablation study is conducted to evaluate how much each module of the framework in this embodiment contributes to the performance. In this study, PerFedRec-Variation 1 uses no personalized recommendation, PerFedRec-Variation 2 uses no feature information, and PerFedRec-Variation 3 uses no user clustering.

Table 4 shows the ablation study results. As shown, the largest improvement comes from personalized recommendation. Moreover, incorporating feature information brings a notable improvement on the performance. Compared to Variation 3 (no user clustering), PerFedRec has negligible performance degradation while reducing communication cost by user clustering.

TABLE 4

| Ablation study on MovieLens dataset | | | | |
| --- | --- | --- | --- | --- |
| | HR@10 | NDCG@10 | HR@20 | NDCG@20 |
| PerFedRec-Validation 1 | 0.4464 | 0.2497 | 0.6405 | 0.2965 |
| PerFedRec-Validation 2 | 0.6087 | 0.4340 | 0.7381 | 0.4677 |
| PerFedRec-Validation 3 | 0.6102 | 0.4453 | 0.7359 | 0.4766 |
| PerFedRec | 0.6119 | 0.4409 | 0.7402 | 0.4707 |

This embodiment framework highlights the importance of user clustering in personalized federated recommendations and provides a personalized federated recommendation framework. The framework may jointly learn user representations from collaborative and attribute information via GNNs, cluster similar users, and obtain personalized recommendation models by combining the user-level, cluster-level, and global models. To alleviate the communication burden, in some examples, a sampling strategy can be used to select representative clients from each cluster for model federation. Experiments on three real-world datasets demonstrate that the framework in this embodiment can provide desirable performance for federated recommendation. This embodiment provides a Graph Neural Network based Personalized Federated Recommendation (PerFedRec) framework via joint representation learning, user clustering, and model adaptation. This embodiment constructs a collaborative graph and incorporates attribute information to jointly learn the representation through a federated GNN. Based on these learned representations, users are clustered into different user groups and personalized models are leant for each cluster. Then each user learns a personalized model by combining the global federated model, the cluster-level federated model, and the user's fine-tuned local model. In some examples, to alleviate the communication burden, a few representative users (instead of randomly picked users) may be selected from each cluster to participate in training.

Figure 5:
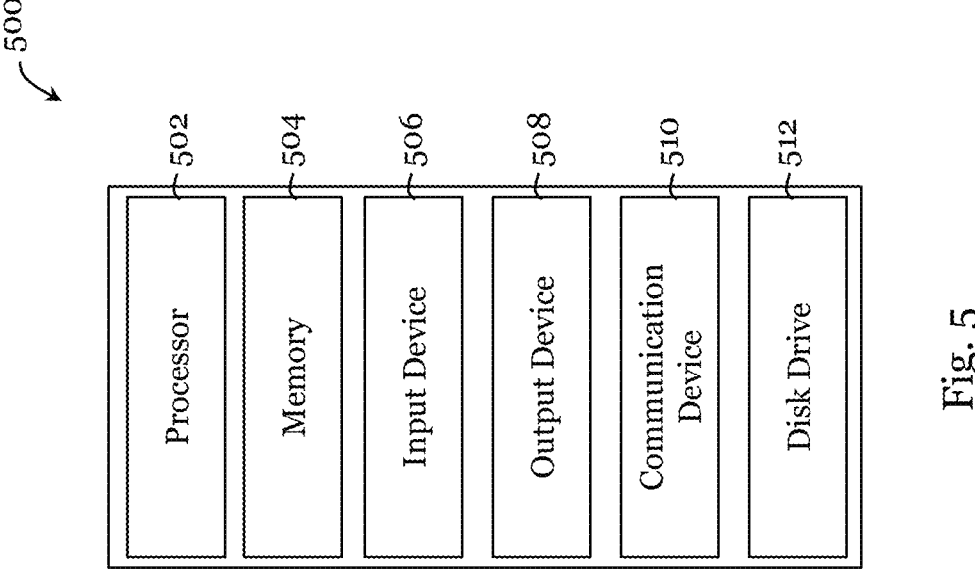
FIG. 5 is a block diagram of an information handling system arranged to implement at least part of the federated recommendation system in some embodiments of the invention.

FIG. 5 shows an example information handling system 500 that can be used as a server such as the server 20, a client device such as the client devices 10₁-10ₙ, or another type of information processing system in some embodiments of the invention. For example, the information handling system 500 may be used to implement the modules 10A, 10B, 10C, 10D and 20A, 20B, 20C of the federated recommendation system of FIG. 4. The information handling system 500 can be used to operate one or more of the method embodiments of the invention, each at least partly or entirely. The information handling system 500 generally comprises suitable components necessary to receive, store, and execute appropriate computer instructions, commands, and/or codes. The main components of the information handling system 500 are a processor 502 and a memory (storage) 504. The processor 502 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 504 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data, e.g., computer instructions, commands, codes, information and/or data in the federated recommendation systems in some embodiments of the invention, may be stored in the memory 504. Computer instructions for executing or facilitating executing one or more of the method embodiments of the invention may be stored in the memory 504. The processor 502 and memory (storage) 504 may be integrated or separated (and operably connected). Optionally, the information handling system 500 further includes one or more input devices Example of such input device 506 include: keyboard, mouse, stylus, image scanner, microphone, tactile/touch input device (e.g., touch sensitive screen), image/video input device (e.g., camera), etc. Optionally, the information handling system 500 further includes one or more output devices 508. Example of such output device 508 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 500 may further include one or more disk drives 512 which may include one or more of: solid state drive, hard disk drive, optical drive, flash drive, magnetic tape drive, etc. A suitable operating system may be installed in the information handling system 500, e.g., on the disk drive 512 or in the memory 504. The memory 504 and the disk drive 512 may be operated by the processor 502. Optionally, the information handling system 500 also includes a communication device 510 for establishing one or more communication links (not shown) with one or more other computing devices, such as servers, personal computers, terminals, tablets, phones, watches, IoT devices, or other wireless computing devices. The communication device 510 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, above 5G, or the like) transceiver, an optical port, an infrared port, a USB connection, or other wired or wireless communication interface(s). Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 502, the memory 504 (optionally the input device(s) 506, the output device(s) 508, the communication device(s) 510 and the disk drive(s) 512, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the information handling system 500 shown in FIG. 5 is merely an example and that the information handling system 500 can in other embodiments have different configurations (e.g., include additional components, include fewer components, etc.).

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system", "computing device", and the like are used, these terms are intended to include (but not limited to) any appropriate arrangement of computer or information processing hardware capable of implementing the function described.

The technical solution provided in some embodiments of the invention relates to a personalized federated recommendation framework, which adopts clustering method to cluster similar users. In this way, better recommendation performance can be achieved while user privacy can be protected. In some embodiments, the framework makes good use of contextual information and incorporate them in the system. By considering the contextual feature, the model performance is further enhanced. Compared with the existing recommender systems/models, some embodiments of the invention not only can improve the recommendation performance by adopting personalized recommendation based on user clustering but also can provide privacy-preserving capability (at the acceptable cost of performance loss).

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). Some embodiments of the invention may address one or more additional or alternative technical problems not specifically mentioned above (e.g., with reference to the embodiment of FIG. 4).

The invention claimed is:

1. A computer-implemented method for operating a server of a federated recommendation system, comprising:

(a) grouping a plurality of client device users of the federated recommendation system into two or more clusters;

(b) for each respective one of the clusters: processing local model parameters associated with local graph neural networks for at least some of the client device users in the corresponding cluster, to obtain cluster-level model parameters associated with a cluster-level federated model for the corresponding cluster;

(c) processing local model parameters associated with local graph neural networks for at least some of the client device users in each of two or more of the clusters to obtain global model parameters associated with a global federated model for the federated recommendation system; and (d) providing, to a client device for a client device user of the federated recommendation system, the cluster-level model parameters associated with the cluster-level federated model for the corresponding cluster of the client device user and the global model parameters associated with the global federated model, for facilitating generation or update of a personalized recommendation model for the client device user.

2. The computer-implemented method of claim 1, wherein the personalized recommendation model for the client device user is operable to provide a recommendation to the client device user; and wherein the recommendation comprises a predicted rating or preference associated with a plurality of items.

3. The computer-implemented method of claim 1, wherein the local model parameters associated with each respective local graph neural network respectively comprise gradients of the corresponding local graph neural network; wherein the cluster-level model parameters associated with each respective cluster-level federated model respectively comprise gradients of the corresponding cluster-level federated model; and/or wherein the global model parameters associated with the global federated model comprise gradients of the global federated model.

4. The computer-implemented method of claim 1, wherein the grouping in (a) is based on user representations of the plurality of client device users of the federated recommendation system.

5. The computer-implemented method of claim 1, wherein in (b), for at least one of the clusters, the processing of the local model parameters is based on a weighted sum method; and wherein the weighted sum method applies one or more weightings to one or more of the local graph neural networks for the at least some of the client device users in the corresponding cluster.

6. The computer-implemented method of claim 1, wherein (b) comprises:

for at least one of the clusters: processing local model parameters associated with local graph neural networks for only some of the client device users in the corresponding cluster, to obtain cluster-level model parameters associated with a cluster-level federated model for the corresponding cluster.

7. The computer-implemented method of claim 6, wherein the only some of the client device users in the corresponding cluster are selected randomly from all the client device users in the corresponding cluster.

8. The computer-implemented method of claim 1, wherein (b) comprises:

for each respective one of the clusters: processing local model parameters associated with local graph neural networks for only some of the client device users in the corresponding cluster, to obtain cluster-level model parameters associated with a cluster-level federated model for the corresponding cluster.

9. The computer-implemented method of claim 8, wherein the number of client device users selected for each respective one of the clusters is based on the total number of client device users in the corresponding cluster.

10. The computer-implemented method of claim 1, wherein (c) comprises:

processing local model parameters associated with local graph neural networks for at least some of the client device users of the federated recommendation system in each respective one of the clusters to obtain the global model parameters associated with the global federated model for the federated recommendation system.

11. The computer-implemented method of claim 1, wherein (c) comprises: processing local model parameters associated with local graph neural networks for at least some of the client device users of the federated recommendation system in at least two of the clusters using a weighted sum method, to obtain the global model parameters associated with the global federated model for the federated recommendation system; and wherein the weighted sum method applies one or more weightings to one or more of the local graph neural networks for the at least some of the client device users of the federated recommendation system in the at least two of the clusters.

12. A computer-implemented method for operating a client device of a federated recommendation system, comprising:

(a) receiving cluster-level model parameters associated with a cluster-level federated model and global model parameters associated with a global federated model, the cluster-level federated model is for a plurality of client device users of the federated recommendation system that belong to the same cluster as the client device user, and the global federated model is for the federated recommendation system; and (b) generating or updating a personalized recommendation model for a client device user based on the cluster-level model parameters, the global model parameters, and local model parameters associated with a local graph neural network for the client device user; wherein the personalized recommendation model is arranged to provide a recommendation to the client device user.

13. The computer-implemented method of claim 12, wherein the recommendation comprises a predicted rating or preference associated with a plurality of items.

14. The computer-implemented method of claim 12, wherein the cluster-level model parameters associated with the cluster-level federated model is obtained based on local model parameters associated with local graph neural networks for at least some of the client device users in the corresponding cluster; and wherein the global model parameters associated with the global federated model is obtained based on local model parameters associated with local graph neural networks for at least some of the client device users in each of two or more of the clusters.

15. The computer-implemented method of claim 12, wherein the local model parameters associated with the local graph neural network comprise gradients of the local graph neural network; wherein the cluster-level model parameters associated with the cluster-level federated model comprise gradients of the cluster-level federated model; and/or wherein the global model parameters associated with the global federated model comprise gradients of the global federated model.

16. The computer-implemented method of claim 12, wherein (b) comprises generating or updating the personalized recommendation model based on a weighted sum of: the local model parameters, the cluster-level model parameters, and the global model parameters.

17. A computer-implemented method for operating a client device of a federated recommendation system, comprising:

(a) processing user representations and item representations using a personalized recommendation model customized for a client device user of the federated recommendation system; and (b) based on the processing, providing a recommendation to the client device user; wherein the personalized recommendation model is generated or updated based on:

local model parameters associated with a local graph neural network for the client device user;

cluster-level model parameters associated with a cluster-level federated model, the cluster-level federated model is for a plurality of client device users of the federated recommendation system that belong to the same cluster as the client device user; and global model parameters associated with a global federated model for the federated recommendation system.

18. The computer-implemented method of claim 17, wherein the recommendation comprises a predicted rating or preference associated with a plurality of items.

19. The computer-implemented method of claim 17, wherein client device users of the federated recommendation system are grouped into two or more clusters based on user representations of the client device users.

20. The computer-implemented method of claim 19, wherein the cluster-level model parameters associated with the cluster-level federated model is obtained based on local model parameters associated with local graph neural networks for at least some of the client device users in the corresponding cluster; and wherein the global model parameters associated with the global federated model is obtained based on local model parameters associated with local graph neural networks for at least some of the client device users in each of two or more of the clusters.

21. The computer-implemented method of claim 17, wherein the local model parameters associated with the local graph neural network comprise gradients of the local graph neural network; wherein the cluster-level model parameters associated with the cluster-level federated model comprise gradients of the corresponding cluster-level federated model; and/or wherein the global model parameters associated with the global federated model comprise gradients of the global federated model.

22. The computer-implemented method of claim 17, wherein the personalized recommendation model is generated or updated based generated or updated on a weighted sum of the local model parameters, the cluster-level model parameters, and the global model parameters.

23. The computer-implemented method of claim 17, further comprising:

processing, using the local graph neural network for the client device user, (i) raw user representations and raw item representations of the client device user, and (ii) raw user representations and raw item representations of one or more other client device users, to obtain the user representations and the item representations.

24. The computer-implemented method of claim 23, further comprising:

processing user information of a client device user, item information associated with one or more items, and user-item interaction information associated with the client device user's interaction with the one or more items to obtain the raw user representations and the raw item representations.

25. The computer-implemented method of claim 24, wherein the processing to obtain the raw user representations and the raw item representations comprises:

processing the user information and the item information to obtain attribute representations; and processing the attribute representations and the user-item interaction information to obtain the raw user representations and the raw item representations.

26. The computer-implemented method of claim 25, wherein the processing of the user information and the item information comprises:

processing the user information and the item information using a model that comprises at least one linear network/layer and at least one feature crossing network/layer.

27. The computer-implemented method of claim 25, wherein the processing of the attribute representations and the user-item interaction information comprises:

processing the attribute representations and the user-item interaction information using an attention mechanism.

28. A server for a federated recommendation system, comprising:

one or more processors; and memory storing one or more programs configured to be executed by the one or more processors, the one or more programs including instructions for:

grouping a plurality of client device users of the federated recommendation system into two or more clusters;

for each respective one of the clusters: processing local model parameters associated with local graph neural networks for at least some of the client device users in the corresponding cluster, to obtain cluster-level model parameters associated with a cluster-level federated model for the corresponding cluster;

processing local model parameters associated with local graph neural networks for at least some of the client device users in each of two or more of the clusters to obtain global model parameters associated with a global federated model for the federated recommendation system; and providing, to a client device for a client device user of the federated recommendation system, the cluster-level model parameters associated with the cluster-level federated model for the corresponding cluster of the client device user and the global model parameters associated with the global federated model, for facilitating generation or update of a personalized recommendation model for the client device user.

29. A client device for a federated recommendation system, comprising:

one or more processors; and memory storing one or more programs configured to be executed by the one or more processors, the one or more programs including instructions for:

receiving cluster-level model parameters associated with a cluster-level federated model and global model parameters associated with a global federated model, the cluster-level federated model is for a plurality of client device users of the federated recommendation system that belong to the same cluster as the client device user, and the global federated model is for the federated recommendation system; and generating or updating a personalized recommendation model for a client device user based on the cluster-level model parameters, the global model parameters, and local model parameters associated with a local graph neural network for the client device user;

wherein the personalized recommendation model is arranged for providing a recommendation to the client device user.

30. A client device for a federated recommendation system, comprising:

one or more processors; and memory storing one or more programs configured to be executed by the one or more processors, the one or more programs including instructions for:

processing user representations and item representations using a personalized recommendation model customized for a client device user of the federated recommendation system; and based on the processing, providing a recommendation to the client device user;

wherein the recommendation comprises a predicted rating or preference associated with a plurality of items.

* * * * *